(12) United States Patent
Chuang et al.

(10) Patent No.: US 8,576,308 B2
(45) Date of Patent: Nov. 5, 2013

(54) IMAGE PROCESSING METHOD AND IMAGE PROCESSING APPARATUS

(75) Inventors: Che-Lun Chuang, Hsinchu (TW); Chung-Ta Wu, Taichung (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 280 days.

(21) Appl. No.: 13/221,929

(22) Filed: Aug. 31, 2011

(65) Prior Publication Data

US 2012/0281120 A1    Nov. 8, 2012

(30) Foreign Application Priority Data

May 4, 2011  (TW) .............................. 100115617 A

(51) Int. Cl.
*H04N 5/217*   (2011.01)
(52) U.S. Cl.
USPC ....................................................... 348/241
(58) Field of Classification Search
USPC .......... 348/208.4, 208.13, 352, 241; 382/276, 382/274, 275, 266
See application file for complete search history.

(56) References Cited

U.S. PATENT DOCUMENTS

| | | | |
|---|---|---|---|
| 5,592,228 A * | 1/1997 | Dachiku et al. | 348/416.1 |
| 7,103,231 B2 * | 9/2006 | Cornog et al. | 382/276 |
| 7,477,802 B2 * | 1/2009 | Milanfar et al. | 382/299 |
| 8,350,916 B2 * | 1/2013 | Ohmiya et al. | 348/208.99 |
| 2009/0015695 A1 * | 1/2009 | Dunki-Jacobs et al. | 348/241 |
| 2010/0054338 A1 * | 3/2010 | Suzuki et al. | 375/240.16 |
| 2011/0249151 A1 * | 10/2011 | Ito | 348/241 |

* cited by examiner

*Primary Examiner* — Aung S Moe
*Assistant Examiner* — Amy Hsu
(74) *Attorney, Agent, or Firm* — Jianq Chyun IP Office

(57) ABSTRACT

An image processing method and an image processing apparatus are provided. In the image processing method, each of a plurality of original images is divided into K bands, where K is a positive integer greater than or equal to 1. A plurality of local motions of each band in any two adjacent of the original images are calculated, and a global motion of each band is calculated according to the local motions of the band. A horizontal component velocity and a vertical component velocity of each band are generated according to the global motion and a capturing time difference. A plurality of transformation matrixes corresponding to the bands are generated according to the horizontal component velocities, the vertical component velocities, a row readout time, and the width of a valid area. One of the two adjacent original images is transformed according to the transformation matrixes to generate a compensated image.

10 Claims, 4 Drawing Sheets

(a)

(b)

(c)

IMAGE PROCESSING METHOD AND IMAGE PROCESSING APPARATUS

CROSS-REFERENCE TO RELATED APPLICATION

This application claims the priority benefit of Taiwan application serial no. 100115617, filed on May 4, 2011. The entirety of the above-mentioned patent application is hereby incorporated by reference herein and made a part of this specification.

BACKGROUND OF THE INVENTION

1. Field of the Invention

The invention generally relates to an image processing method, and more particularly, to an image processing method for compensating image distortion caused by rolling shutter.

2. Description of Related Art

There are two types of image sensors used in digital cameras. One is CCD image sensors, and the other is CMOS image sensors. One of the major differences between these two types of image sensors is the readout mechanism, wherein the CCD image sensors adopt a synchronous shutter mechanism, while the CMOS image sensors adopt a rolling shutter mechanism.

Based on the rolling shutter mechanism, each time a CMOS image sensor exposes a row of pixels of an image, the total exposure time of each row is the same, but each row is exposed by starting from a different time point, and the exposure starting time point of each row in the image has a specific delay time. Thus, if an object captured by a digital camera having a CMOS image sensor does not move relative to the digital camera, the rolling shutter mechanism does not produce any problem. However, image distortion is produced if the object moves relative to the digital camera.

FIG. 1 is a diagram illustrating image distortion caused by rolling shutter. Referring to FIG. 1, lossless images are shown in the first row 110, distorted images are shown in the second row 120, the directions of the relative movement are indicated in the third row 130, and the portions marked with diagonal lines are valid areas of the images. If the object moves relative to the digital camera in the horizontal direction, as shown in FIG. 1(a) and FIG. 1(b), the images captured by the digital camera are skew.

If the object moves relative to the digital camera in the vertical direction, as shown in FIG. 1(c) and FIG. 1(d), the images captured by the digital camera are shrunk or stretched. If the object moves relative to the digital camera in drastically changing directions, as shown in FIG. 1(e), the image captured by the digital camera is deformation as jello when wobble occurs.

SUMMARY OF THE INVENTION

Accordingly, the invention is directed to an image processing method, wherein transformation matrixes are generated through velocity estimation, and a distorted image is transformed according to the transformation matrixes to generate a compensated image, so that the problem of image distortion is resolved.

The invention is directed to an image processing apparatus which performs velocity estimation on an image to generate a transformation matrix and outputs a compensated image.

The invention provides an image processing method. A plurality of original images is continuously captured according to capturing time difference, wherein a valid area of the original images has a size of M×N, M is the length of the valid area, N is the width of the valid area, and M and N are both positive integers. In the image processing method, each of the original images is divided into K bands, wherein K is a positive integer greater than or equal to 1. A plurality of local motions of each of the bands in any two adjacent of the original images is calculated, and a global motion of each of the bands is calculated according to the local motions of the band. A horizontal component velocity and a vertical component velocity of each of the bands are generated according to the capturing time difference and the global motions respectively. A plurality of transformation matrixes corresponding to the bands is generated according to the horizontal component velocities, the vertical component velocities, a row readout time, and the width of the valid area. One of the two adjacent original images is transformed according to the transformation matrixes to generate a compensated image.

According to an embodiment of the invention, a smoothing process is respectively performed on the horizontal component velocities and the vertical component velocities to generate a plurality of smooth horizontal component velocities and a plurality of smooth vertical component velocities corresponding to the bands.

According to an embodiment of the invention, the step of generating the transformation matrixes corresponding to the bands according to the horizontal component velocities, the vertical component velocities, the row readout time, and the width of the valid area includes generating the transformation matrixes corresponding to the bands according to the smooth horizontal component velocities, the smooth vertical component velocities, the row readout time, and the width of the valid area.

According to an embodiment of the invention, the row readout time is the time required by an image processing apparatus for reading one row within the valid area of the original images.

According to an embodiment of the invention, the image processing method further includes following steps. A scaling matrix is generated according to the length of the valid area and the width of the valid area. The compensated image is transformed according to the scaling matrix to generate a user oriented image.

According to an embodiment of the invention, a valid area of the user oriented image has a size of M'×N', wherein M' is a length of the valid area of the user oriented image, N' is a width of the valid area of the user oriented image, and M' and N' are positive integers.

The invention provides an image processing apparatus for continuously capturing a plurality of original images according to a capturing time difference, wherein a valid area of the original images has a size of M×N, M is the length of the valid area, N is the width of the valid area, and M and N are both positive integers. The image processing apparatus includes a velocity estimation module and a compensator. The velocity estimation module divides each of the original images into K bands, wherein K is a positive integer greater than or equal to 1. The velocity estimation module calculates a plurality of local motions of each of the bands in any two adjacent of the original images and calculates a global motion of each of the bands according to the local motions of the band. The velocity estimation module generates a plurality of horizontal component velocities and a plurality of vertical component velocities of the bands according to the capturing time difference and the global motions respectively. The compensator is coupled to the velocity estimation module. The compensator generates a plurality of transformation matrixes corresponding to the bands according to the horizontal component velocities, the vertical component velocities, a row readout time, and the width of the valid area. The compensator transforms one of the two adjacent original images according to the transformation matrixes to generate a compensated image.

According to an embodiment of the invention, the image processing apparatus further includes a smooth velocity generator connected between the velocity estimation module and the compensator in series. The smooth velocity generator performs a smoothing process on the horizontal component velocities and the vertical component velocities respectively and sends the processed horizontal component velocities and the processed vertical component velocities to the compensator.

As described above, in the invention, regarding a skew, shrunk, stretched, or wobble caused by rolling shutter, velocity estimation is done according to local motions and global motions to generate transformation matrixes, and the distorted image is transformed according to the transformation matrixes to generate a compensated image, so that the problem of image distortion can be resolved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
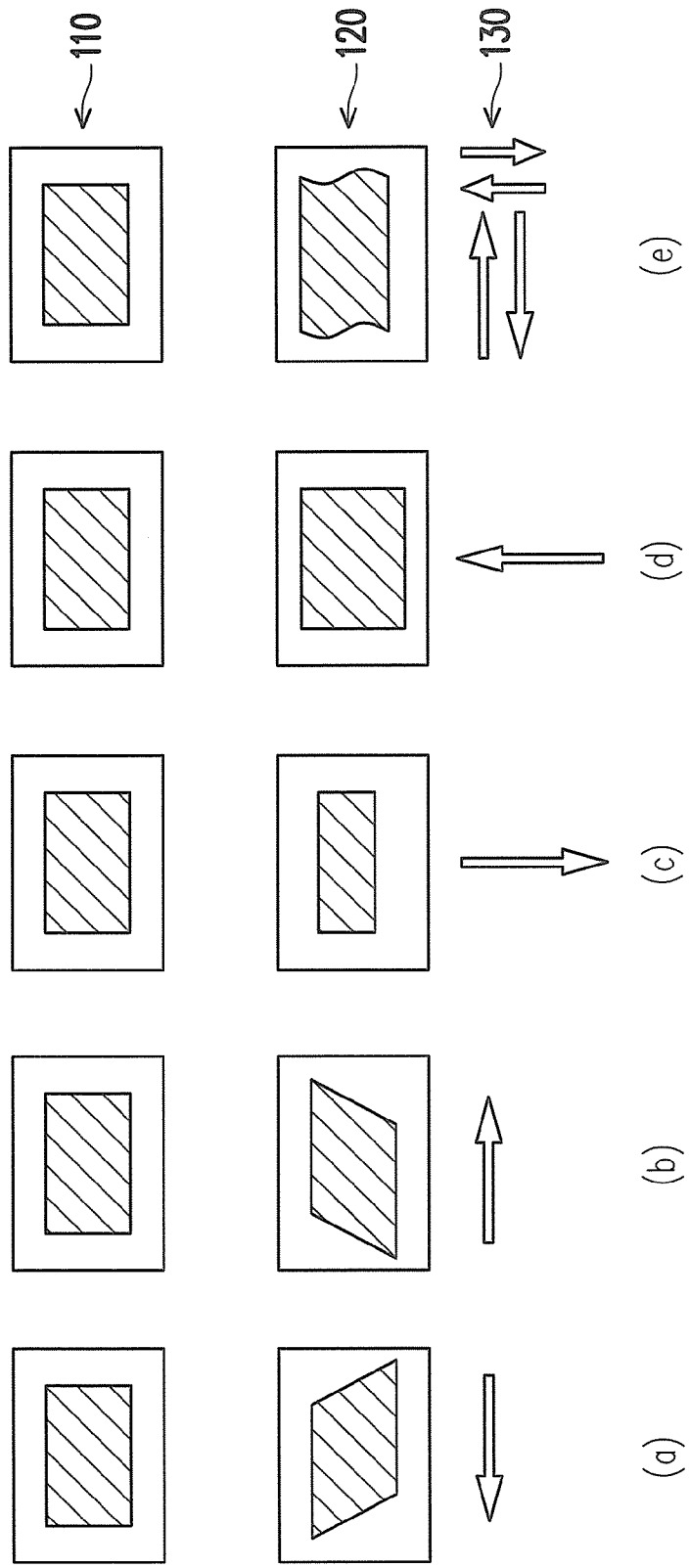
FIG. 1 is a diagram illustrating image distortion caused by rolling shutter.

Reference will now be made in detail to the present preferred embodiments of the invention, examples of which are illustrated in the accompanying drawings. Wherever possible, the same reference numbers are used in the drawings and the description to refer to the same or like parts.

Figure 2:
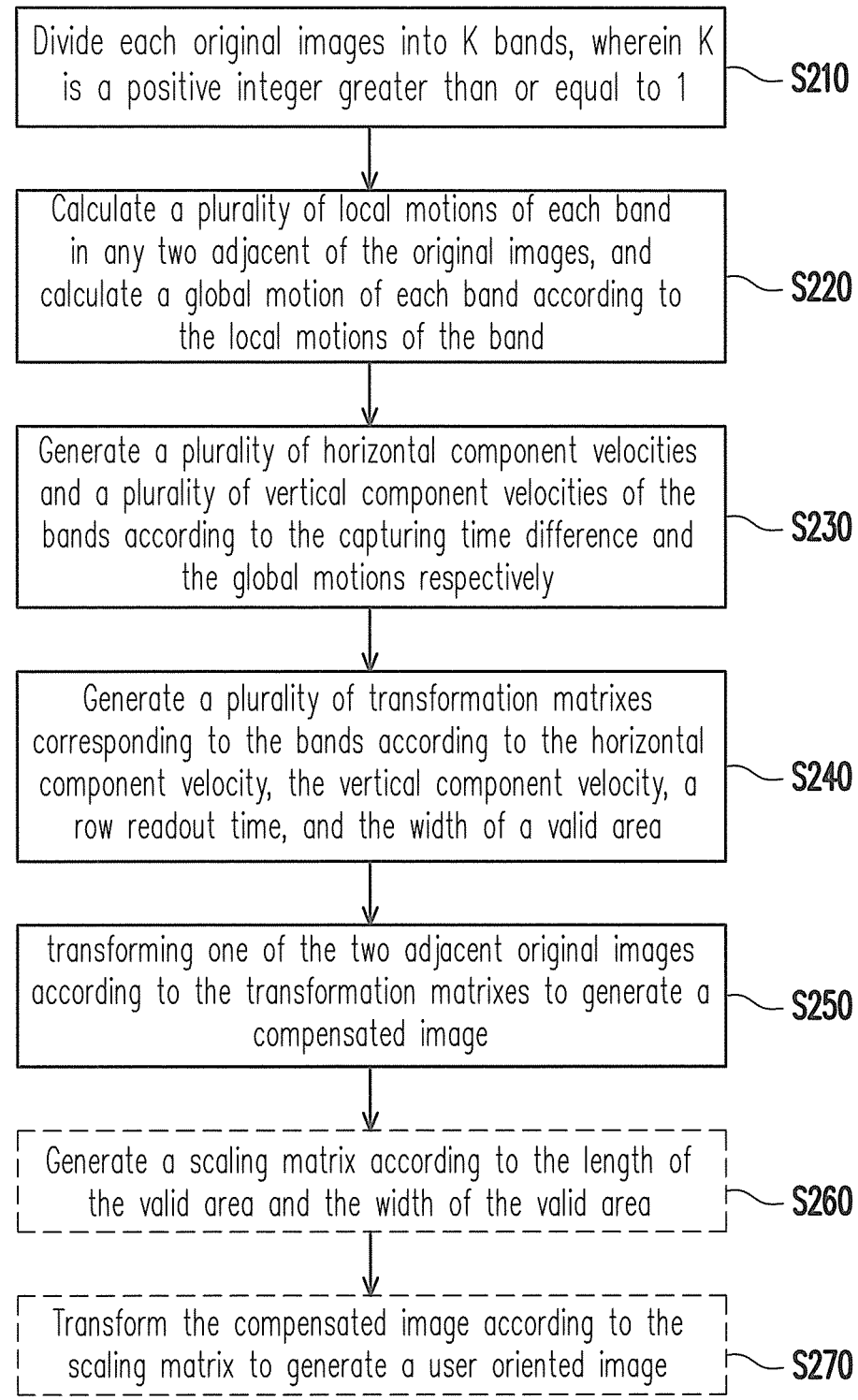
FIG. 2 is a flowchart of an image processing method according to an embodiment of the invention.
Figure 3:
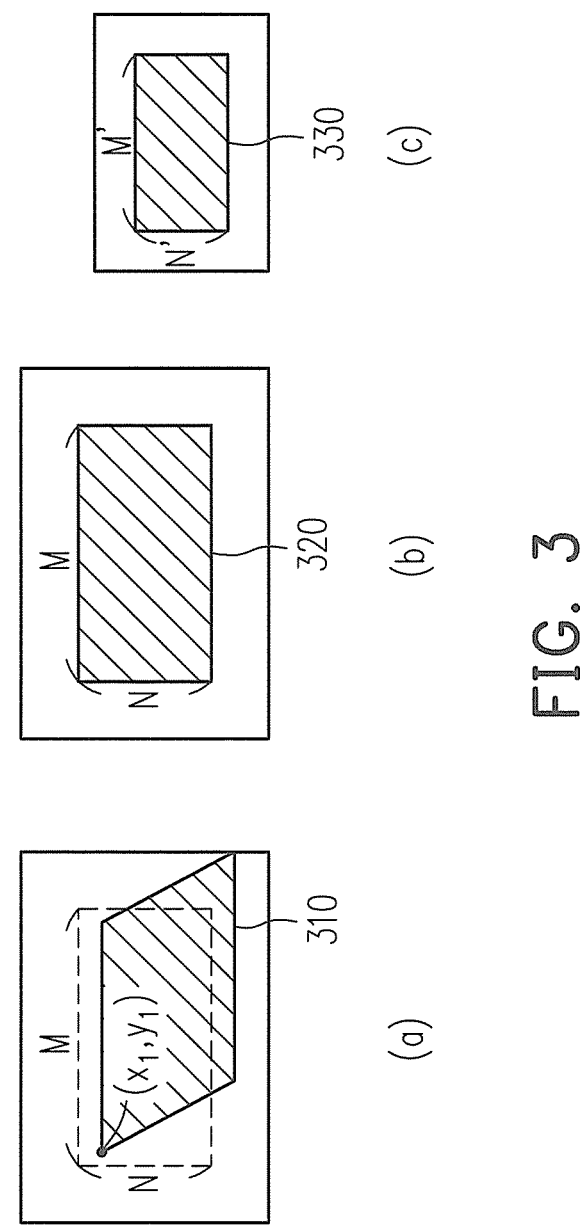
FIG. 3 is a diagram illustrating an image compensation according to an embodiment of the invention.

FIG. 2 is a flowchart of an image processing method according to an embodiment of the invention. FIG. 3 is a diagram illustrating an image compensation according to an embodiment of the invention. Referring to both FIG. 2 and FIG. 3, a plurality of original images is continuously captured by using an image processing apparatus having a CMOS image sensor, wherein a valid area of the original images has a size of M×N, M is the length of the valid area, N is the width of the valid area, and M and N are both positive integers, as shown in FIGS. 3(a) and 3(b). First, in step S210, each original image is divided into K bands, wherein K is a positive integer greater than or equal to 1. Below, the present embodiment will be described by respectively assuming K to be 1 and greater than 1.

When K is 1, each original image has only one band. In step S220, a plurality of local motions of each band in any two adjacent of the original images is calculated, and a global motion of each band is calculated according to the local motions of the band. Those having ordinary knowledge in the art should understand that a plurality of local motions between two consecutive original images can be calculated through block matching and a global motion can be calculated according to these local motions. For example, a mode of the local motions may be calculated and served as the global motion. Namely, the local motions are counted and the local motion appears the most is selected as the global motion. Or, an average of all the local motions may be calculated and served as the global motion. In the present embodiment, because each original image has only one band when K is 1, only one global motion is obtained between two consecutive images.

Then, in step S230, a plurality of horizontal component velocities and a plurality of vertical component velocities of the bands are generated according to a capturing time difference and the global motions respectively. The image processing apparatus having the CMOS image sensor continuously captures two images at an interval of a capturing time difference τ, and the global motion includes a horizontal component and a vertical component. Thus, a horizontal component velocity $v_x$ is calculated by using a ratio of the horizontal component of a global motion to the capturing time difference τ, and a vertical component velocity $v_y$ is calculated by using a ratio of the vertical component of the global motion to the capturing time difference τ. Next, a transformation matrix A is generated according to the horizontal component velocity $v_x$, the vertical component velocity $v_y$, a row readout time t, and the width N of the valid area (step S240).

The valid area block 310 in FIG. 3(a) shows a skew image captured by an image processing apparatus which has a CMOS image sensor and adopts a rolling shutter mechanism. The skew indicates that there is relative movement between the image processing apparatus and the captured object. In order to compensate such an image distortion to restore the original image in FIG. 3(a) into the undistorted image in FIG. 3(b), the correspondence between the valid area block 310 and the valid area block 320 has to be found out. Assuming that the first pixel within the valid area block 310 is located at $(x_1, y_1)$, through deduction, it is determined that in the present embodiment, the valid area block 310 can be transformed into the valid area block 320 by using a transformation matrix A. Herein the transformation matrix A is a 3×3 matrix, and elements of the matrix are a function of the horizontal component velocity $v_x$, the vertical component velocity $v_y$, a row readout time t, the width N of the valid area, and the position $y_1$ of the pixel, wherein the row readout time t is the time required by the image processing apparatus for reading one row within the valid area of the original image. The transformation matrix A can be expressed as:

$$A = \begin{bmatrix} a_{11} & a_{12} & a_{13} \\ a_{21} & a_{22} & a_{23} \\ 0 & 0 & 1 \end{bmatrix}$$

wherein $a_{11} = 1, a_{21} = 0, a_{13} = v_x \tau y_1,$ $$a_{23} = \frac{v_y \tau y_1}{1 - v_y \tau} \quad a_{12} = \frac{v_x \tau (N-1)}{N + \frac{v_x \tau (N-1)}{1 - v_y \tau}} \quad a_{22} = \frac{N + \frac{v_y \tau (N-1)}{1 - v_y \tau}}{N}$$

The elements $a_{11}$ and $a_{22}$ are presented to compensate the shrunk or stretched distortion of the image, the elements $a_{13}$ and $a_{23}$ are presented to compensate any motion, and the elements $a_{12}$ and $a_{21}$ are presented to compensate the wobble distortion.

After obtaining the transformation matrix A, the second one of two consecutive images is transformed by using the transformation matrix A to generate the compensated image as shown in FIG. 3(b) (step S250).

The size of the images in FIG. 3(a) and FIG. 3(b) is the size of images captured by the image processing apparatus. The compensated image is further transformed into an user oriented image. As shown in FIG. 3(c), the valid area of the user oriented image is M'×N', wherein M' is the length of the valid area of the user oriented image, N' is the width of the valid area of the user oriented image, and M' and N' are both positive integers. Thus, in step S260, a scaling matrix B is generated according to the length M of the valid area and the width N of the valid area. In the present embodiment, the scaling matrix B is also a 3×3 matrix, wherein the element in the first row and the first column of the matrix is a ratio of the length M' of the valid area of the user oriented image to the length M of the valid area of the original image, and the element in the second row and the second column of the matrix is the ratio of the width N' of the valid area of the user oriented image to the width N of the valid area of the original image. The scaling matrix B is expressed as:

$$B = \begin{bmatrix} b_{11} & 0 & 0 \\ 0 & b_{22} & 0 \\ 0 & 0 & 1 \end{bmatrix}$$

wherein $$b_{11} = \frac{M'}{M} \quad b_{22} = \frac{N'}{N}$$

The compensated image is transformed by using the scaling matrix B. Namely, the valid area block 320 is converted into the valid area block 330 by using the scaling matrix B to generate the user oriented image (step S270).

It should be noted that when K is 1, since there are only one horizontal component velocity $v_x$ and only one vertical component velocity $v_y$ between every two images, only one transformation matrix A is obtained, and accordingly only the image distortions illustrated in FIGS. 1(a)-1(d) can be compensated. The image distortions illustrated in FIGS. 1(a)-1(d) are caused when the image processing apparatus and the captured object move relative to each other in the same direction and the relative velocity is slow. When the image processing apparatus and the captured object do not move relative to each other in the same direction and the relative velocity is fast, as shown in FIG. 1(e), the wobble image distortion can be compensated in following embodiment in which K is greater than 1.

Figure 4:
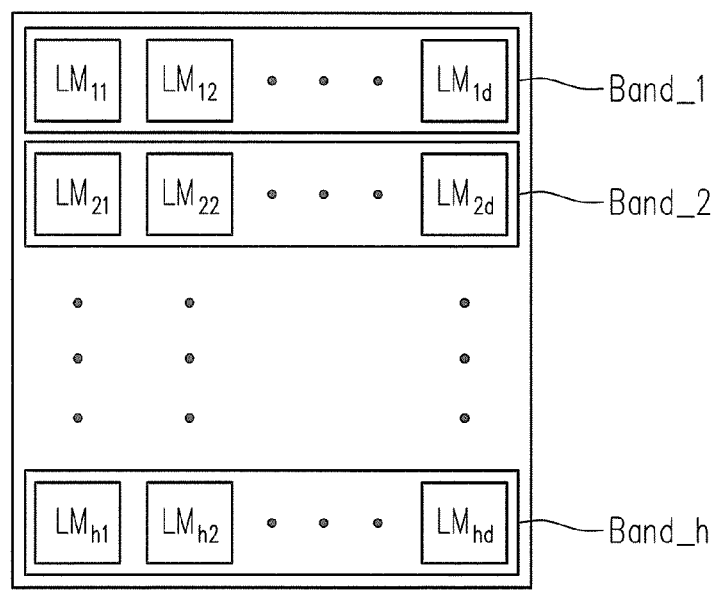
FIG. 4 is a diagram illustrating bands of an image according to an embodiment of the invention.

When K is greater than 1, each image has multiple bands. FIG. 4 is a diagram illustrating bands of an image according to an embodiment of the invention. Referring to FIG. 4, the image is divided into h bands (i.e., the $1^{st}$ band Band_1 to the $h^{th}$ band Band_h), and each band is further divided into d blocks. The $1^{st}$ block of the $1^{st}$ band Band_1 is indicated as $LM_{11}$, the $d^{th}$ block of the $h^{th}$ band Band_h is indicated as $LM_{hd}$, and so on. In step S220, d local motions of each band in any two adjacent original images are calculated, and a global motion of each band is calculated according to the d local motions of the band. Namely, each band has its own global motion. For example, the $1^{st}$ band Band_1 has a global motion $GM_1$, the $2^{nd}$ band Band_2 has a global motion $GM_2, \ldots$, the $h^{th}$ band Band_h has a global motion $GM_h$.

Similarly, in step S230, a plurality of horizontal component velocities and a plurality of vertical component velocities of the bands are generated according to the global motions and the capturing time difference $\tau$ respectively. A horizontal component velocity $v_{x1}$ is calculated according to the ratio of the horizontal component of the global motion $GM_1$ of the $1^{st}$ band Band_1 to the capturing time difference $\tau$. A vertical component velocity $v_{y1}$ is calculated according to the ratio of the vertical component of the global motion $GM_1$ of the $1^{st}$ band Band_1 to the capturing time difference $\tau$. Thus, in the present embodiment, there are h horizontal component velocities $v_{x1}$-$v_{xh}$ and h vertical component velocities $v_{y1}$-$v_{yh}$.

The present embodiment is aimed at resolving the wobble image distortion, which means the horizontal component velocities $v_{x1}$-$v_{xh}$ and the vertical component velocities $v_{y1}$-$v_{yh}$, between different bands may be very different. Accordingly, a smoothing process is performed on the horizontal component velocities $v_{x1}$-$v_{xh}$ and the vertical component velocities $v_{y1}$-$v_{yh}$ to generate a plurality of smooth horizontal component velocities and a plurality of smooth vertical component velocities corresponding to the bands. The smoothing process may be a weighting sum operation. For example, the horizontal component velocity $v_{x2}$ of the $2^{nd}$ band can be calculated through:

$$v_{x2} = \frac{v_{x1} + 2 \times v_{x2} + v_{x3}}{4}$$

Transformation matrixes A1-Ah corresponding to the bands are generated according to the smooth horizontal component velocities, the smooth vertical component velocities, a row readout time, and the width of the valid area (step S240). After that, each block in the second one of the two consecutive images is transformed according to the corresponding transformation matrix, so as to obtain a compensated image (step S250).

Figure 5:
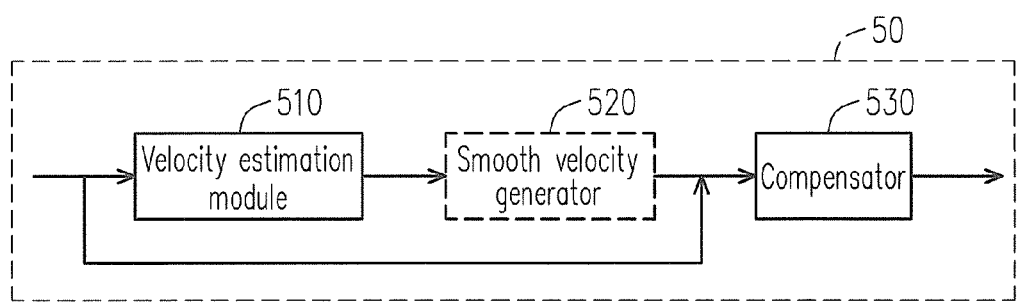
FIG. 5 is a block diagram of an image processing apparatus according to an embodiment of the invention.

The invention further provides an image processing apparatus corresponding to the image processing method in each embodiment described above. FIG. 5 is a block diagram of an image processing apparatus according to an embodiment of the invention. Referring to FIG. 5, the image processing apparatus 50 includes a velocity estimation module 510 and a compensator 530. The velocity estimation module 510 divides each original image into K bands (K is a positive integer greater than or equal to 1), calculates a plurality of local motions of each band in any two adjacent original images, and calculates a global motion of each bands according to the local motions of the band. The velocity estimation module 510 further generates a plurality of horizontal component velocities and a plurality of vertical component velocities of the bands according to the global motions and a capturing time difference.

The compensator 530 is coupled to the velocity estimation module 510. The compensator 530 receives the horizontal component velocities and the vertical component velocities generated by the velocity estimation module 510 and generates a plurality of transformation matrixes corresponding to the bands according to the horizontal component velocities, the vertical component velocities, the row readout time, and the width of the valid area. The compensator 530 further transforms one of any two adjacent original images according to the transformation matrixes to generate a compensated image.

In another embodiment, the image processing apparatus 50 further includes a smooth velocity generator 520 connected between the velocity estimation module 510 and the compensator 530 in series. The smooth velocity generator 520 performs a smoothing process on the horizontal component velocities and the vertical component velocities received from the velocity estimation module 510 and sends the processed horizontal component velocities and vertical component velocities to the compensator 530. Other details of the operation flow in the present embodiment have been described in foregoing embodiments therefore will not be described herein.

In summary, in the invention, regarding a skew, shrunk, stretched, or wobble image caused by rolling shutter, an image processing apparatus having a CMOS image sensor can perform velocity estimation according to local motions, global motions, and a capturing time difference to generate transformation matrixes, transform the distorted image according to the transformation matrixes to generate a compensated image. Thereby, the problem of image distortion can be resolved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing method, for continuously capturing a plurality of original images according to a capturing time difference, wherein a valid area of the original images has a size of M×N, M is a length of the valid area, N is a width of the valid area, and M and N are positive integers, the image processing method comprising:
   dividing each of the original images into K bands, wherein K is a positive integer greater than or equal to 1;
   calculating a plurality of local motions of each of the bands in any two adjacent of the original images, and calculating a global motion of each of the bands according to the local motions of the band;
   generating a plurality of horizontal component velocities and a plurality of vertical component velocities of the bands according to the capturing time difference and the global motions respectively;
   generating a plurality of transformation matrixes corresponding to the bands according to the horizontal component velocities, the vertical component velocities, a row readout time, and the width of the valid area; and
   transforming one of the two adjacent original images according to the transformation matrixes to generate a compensated image.

2. The image processing method according to claim 1 further comprising:
   performing a smoothing process on the horizontal component velocities and the vertical component velocities respectively to generate a plurality of smooth horizontal component velocities and a plurality of smooth vertical component velocities corresponding to the bands.

3. The image processing method according to claim 2, wherein the step of generating the transformation matrixes corresponding to the bands according to the horizontal component velocities, the vertical component velocities, the row readout time, and the width of the valid area comprises:
   generating the transformation matrixes corresponding to the bands according to the smooth horizontal component velocities, the smooth vertical component velocities, the row readout time, and the width of the valid area.

4. The image processing method according to claim 1, wherein the row readout time is a time required by an image processing apparatus for reading one row within the valid area of the original images.

5. The image processing method according to claim 1 further comprising:
   generating a scaling matrix according to the length of the valid area and the width of the valid area; and
   transforming the compensated image according to the scaling matrix to generate an user oriented image.

6. The image processing method according to claim 5, wherein a valid area of the user oriented image has a size of M'×N', wherein M' is a length of the valid area of the user oriented image, N' is a width of the valid area of the user oriented image, and M' and N' are positive integers.

7. An image processing apparatus, for continuously capturing a plurality of original images according to a capturing time difference, wherein a valid area of the original images has a size of M×N, M is a length of the valid area, N is a width of the valid area, and M and N are positive integers, the image processing apparatus comprising:
   a velocity estimation module, dividing each of the original images into K bands, wherein K is a positive integer greater than or equal to 1, calculating a plurality of local motions of each of the bands in any adjacent two of the original images, calculating a global motion of each of the bands according to the local motions of the band, and generating a plurality of horizontal component velocities and a plurality of vertical component velocities of the bands according to the capturing time difference and the global motions respectively; and
   a compensator, coupled to the velocity estimation module, generating a plurality of transformation matrixes corresponding to the bands according to the horizontal component velocities, the vertical component velocities, a row readout time, and the width of the valid area, and transforming one of the two adjacent original images according to the transformation matrixes to generate a compensated image.

8. The image processing apparatus according to claim 7 further comprising:
   a smooth velocity generator, connected between the velocity estimation module and the compensator in series, performing a smoothing process on the horizontal component velocities and the vertical component velocities respectively and sending the processed horizontal component velocities and the processed vertical component velocities to the compensator.

9. The image processing apparatus according to claim 7, wherein the compensator generates a scaling matrix according to the length of the valid area and the width of the valid area and transforms the compensated image according to the scaling matrix to generate an user oriented image.

10. The image processing apparatus according to claim 9, wherein a valid area of the user oriented image has a size of M'×N', wherein M' is a length of the valid area of the user oriented image, N' is a width of the valid area of the user oriented image, and M' and N' are positive integers.

* * * * *